Sept. 15, 1936.  R. C. JACOBS  2,054,325
GLARE SHIELD
Filed May 25, 1935

INVENTOR.
Rex C. Jacobs
BY
ATTORNEYS

Patented Sept. 15, 1936

2,054,325

UNITED STATES PATENT OFFICE 2,054,325

GLARE SHIELD

Rex C. Jacobs, Detroit, Mich., assignor to F. L. Jacobs Company, Detroit, Mich., a corporation of Michigan Application May 25, 1935, Serial No. 23,351

6 Claims. (Cl. 296—97)

This invention relates to glare shields for automotive vehicles and more particularly to the means for supporting the same.

The primary object of the present invention is to provide means for supporting a glare shield whereby the shield may be concealed from view by moving it into the space between the header and roof of an automobile. To attain this object the invention provides a bracket for supporting a glare shield of the bent arm type and means for movably supporting the bracket within the space between the header and roof adjacent to an opening in the header whereby the shield may be moved under manual pressure to a position where it is concealed in the space above the header or to a position where it projects beneath the header.

Another object of the invention is to provide yieldable means for holding the glare shield against movement with respect to its supporting means for the purpose of holding the glare shield in its concealed position.

With the above and other ends in view the invention consists in matters hereinafter more particularly pointed out with reference to the accompanying drawing, in which—

Figure 1:
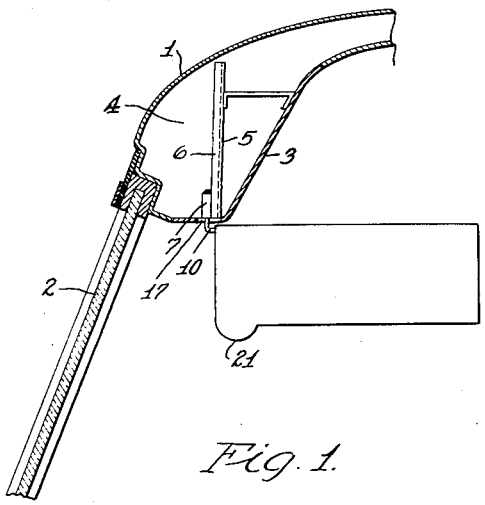
Figure 2:
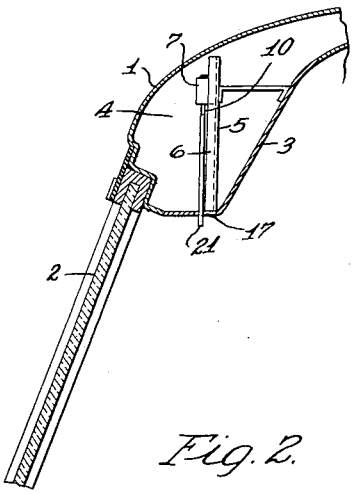
Figure 3:
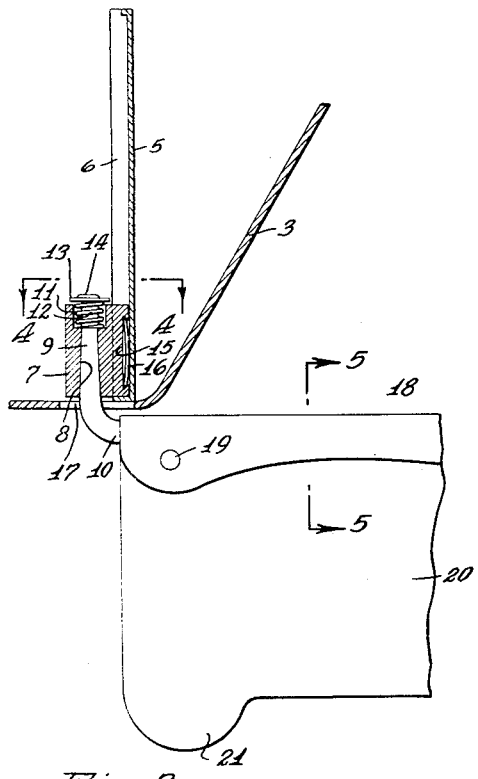
Figure 4:
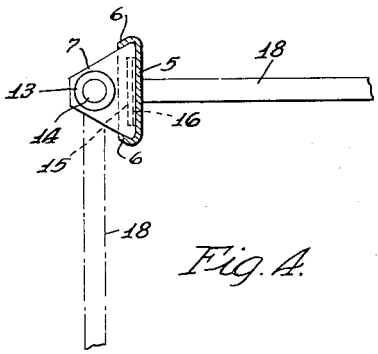
Figure 5:
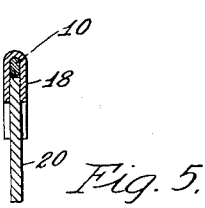

Figures 1 and 2 are cross sections through the header of an automobile body illustrating the glare shield and its support in different positions;

Fig. 3 is a vertical cross section of the glare shield bracket and its support, and Figs. 4 and 5 are cross sections respectively taken on lines 4—4 and 5—5 of Fig. 3.

Like characters of reference are employed throughout to designate corresponding parts.

The numeral 1 indicates the roof of an automobile body, 2 the windshield, and 3 a header mounted therein to provide a space 4 above the same and beneath the roof. Secured to the header 3 is a channel member 5 having converging side flanges as illustrated in Fig. 4 providing a dovetail guide. Slidably received in the guide 5 is a dovetail bracket 7 having a tapered bore 8 receiving the tapered end 9 of a bent arm 10 which supports a glare shield in a manner to be presently described.

The upper end of the tapered bore 8 is counterbored at 11 to receive a spring 12 which is compressed beneath a washer 13 on the end 9 of the bent arm 10. The washer 13 is secured on the end 9 by riveting over the end 9 as indicated at 14. Received in a recess 15 in the back of the bracket 7 is a leaf spring 16 which frictionally engages the guide 5 to resist movement of the bracket relative thereto. Adjacent to the lower end of the guide 5 the header 3 is provided with a slot 17.

The angularly extending part of the arm 10 is flattened as shown more clearly in Fig. 5 and received thereon is an inverted U-shaped member 18, the two arms of which are riveted together as indicated at 19. A board 20 is received and secured by the rivets 19 in the U-shaped element 18 and the board 20 is provided with a tab 21.

The board 20 may be formed of a composition commercially known as masonite which is a fibrous opaque material or it may be formed of colored glass in which case it would be semi-transparent. In some cases the member 18 will not be exposed as illustrated in Fig. 3 but will be entirely covered with upholstering fabric to match the interior of the automobile upon which it is used, as illustrated in Fig. 1.

In Figs. 1 and 3 the shield is shown in positions of use and it is obvious that the arm 10, with the shield thereon, may be swung around its fulcrum axis in the bracket 7 to suit the wishes of the user. In the event that circumstances do not require the use of a shield the arm 10 is moved from whatever position it may be in, such as the positions shown in Figs. 1 and 3, to a position where the arm 10 is parallel with the sides of the slot 17. The shield is then manually pushed upwardly and the bracket 7 slides in the guide 5 from the position of Fig. 1 to that shown in Fig. 2 where the shield is disposed in the space 4. The only part of the shield exposed is the tab 21 which provides means whereby the shield may be grasped and lowered to its operative position.

Although a specific embodiment of the invention is illustrated and described it is to be understood that various changes may be made within the scope of the appended claims without departing from the spirit of the invention, and such changes are contemplated.

What I claim is:—

1. The combination with a vehicle having wall members providing a space adjacent to and above the windshield thereof, a bracket, a bent arm fulcrumed in said bracket and supporting a glare shield, and guide means disposed within said space and supporting said bracket for sliding movement with respect thereto.

2. The combination with a vehicle having wall members providing a space adjacent to and above the windshield thereof, a bracket, a bent arm fulcrumed in said bracket and supporting a glare shield, guide means disposed within said space and supporting said bracket for sliding movement with respect thereto, and yieldable means for holding said bracket against movement with respect to said guide means.

3. The combination with an automobile header having a slot, of means for movably supporting a glare shield whereby it may be disposed on opposite sides of said header by movement through said slot, said means including means permitting said glare shield to fulcrum on an axis substantially parallel to its direction of movement to various positions of adjustment when it is disposed on one side of said header.

4. In combination with a vehicle wall member having a slot, guide means adjacent to said slot, a bracket slidably received in said guide means, a glare shield supported by said bracket, and yieldable means carried by said bracket and frictionally engaging said guide for resisting movement of said bracket.

5. In combination with a vehicle having spaced apart walls one of said walls being substantially horizontal and having an opening, dovetailed guide and slide members disposed in the space between said walls, the guide member being supported in a normal plane by said horizontal wall, and a glare shield carried by said slide member and adapted to be moved into and out of said space by movement of said slide with respect to said guide.

6. In combination with a vehicle having spaced apart walls, a guide element disposed in the space between said walls, means received in said guide element for supporting a glare shield whereby it may be moved into and out of the space between said walls, and yieldable means carried by said first named means and engaging said guide element for holding said first means against movement with respect to said guide element.

REX C. JACOBS.